(12) United States Patent
Allison et al.

(10) Patent No.: US 9,390,821 B2
(45) Date of Patent: Jul. 12, 2016

(54) GRIPPER MECHANISM

(71) Applicant: ROLLS-ROYCE PLC, London (GB)

(72) Inventors: Claire Allison, Derby (GB); Peter Bindin, Shropshire (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/722,725

(22) Filed: May 27, 2015

(65) Prior Publication Data
US 2015/0357062 A1 Dec. 10, 2015

(30) Foreign Application Priority Data

Jun. 5, 2014 (GB) .................................. 1409967.5

(51) Int. Cl.
| | | |
|---|---|---|
| *G21C 19/105* | (2006.01) | |
| *B66C 1/54* | (2006.01) | |
| *B25J 15/00* | (2006.01) | |
| *G21C 19/11* | (2006.01) | |

(52) U.S. Cl.
CPC ........... *G21C 19/105* (2013.01); *B25J 15/0047* (2013.01); *B66C 1/54* (2013.01); *G21C 19/11* (2013.01)

(58) Field of Classification Search
CPC .... G21C 19/105; G21C 19/11; G21C 19/115; B25J 15/0047; B66C 1/54; B66C 1/56
USPC ................ 294/86.25, 94, 95, 110.2, 116, 906
See application file for complete search history.

(56) References Cited

U.S. PATENT DOCUMENTS

| | | | | |
|---|---|---|---|---|
| 3,199,911 A | * | 8/1965 | Denoit ...................... | B66C 1/54 294/110.2 |
| 3,388,942 A | * | 6/1968 | Johnsson ............... | G21C 19/10 294/110.2 |
| 3,408,101 A | * | 10/1968 | Savary ..................... | G21C 7/12 294/116 |
| 3,485,388 A | | 12/1969 | Bohne | |
| 4,253,695 A | * | 3/1981 | Blaive .................. | G21C 19/105 294/110.1 |
| 4,279,699 A | * | 7/1981 | Kuhn .................. | G21C 19/105 294/906 |

(Continued)

FOREIGN PATENT DOCUMENTS

| | | |
|---|---|---|
| GB | 1027066 A | 4/1966 |
| GB | 2 018 220 | * 10/1979 |
| WO | 2012/039647 A1 | 3/2012 |

OTHER PUBLICATIONS

Dec. 17, 2015 Search Report issued in European Patent Application No. 15 16 9402.

(Continued)

*Primary Examiner* — Dean Kramer
(74) *Attorney, Agent, or Firm* — Oliff PLC

(57) ABSTRACT

A gripper mechanism for moving an object having a surface cavity, the gripper mechanism comprising an actuation end moveable in an axial direction and a rotary body. A first mechanism is configured such that movement of the actuation end in an axial direction rotates the rotary body. A gripper is moveable between an engaged position and a disengaged position. In the engaged position the gripper is capable of engaging an object and in the disengaged position the gripper is capable of being received into and removed from a cavity of an object. The gripper is connected to the rotary body by a second mechanism. The second mechanism is configured such that rotary motion of the body moves the gripper between the engaged position and the disengaged position.

19 Claims, 10 Drawing Sheets

(56) References Cited

U.S. PATENT DOCUMENTS 4,362,692 A * 12/1982 Greenaway .......... G21C 19/105
  294/906
4,666,200 A *  5/1987 Walker ................. G21C 19/115
  294/110.2
4,747,997 A    5/1988 Boatwright
5,865,493 A *  2/1999 Lee ........................... B66C 1/66
  294/110.2

OTHER PUBLICATIONS

Feb. 26, 2015 Search Report issued in British Patent Application No. 1409967.5.

Oct. 15, 2015 Partial Search Report issued in European Patent Application No. 15 16 9402.

* cited by examiner

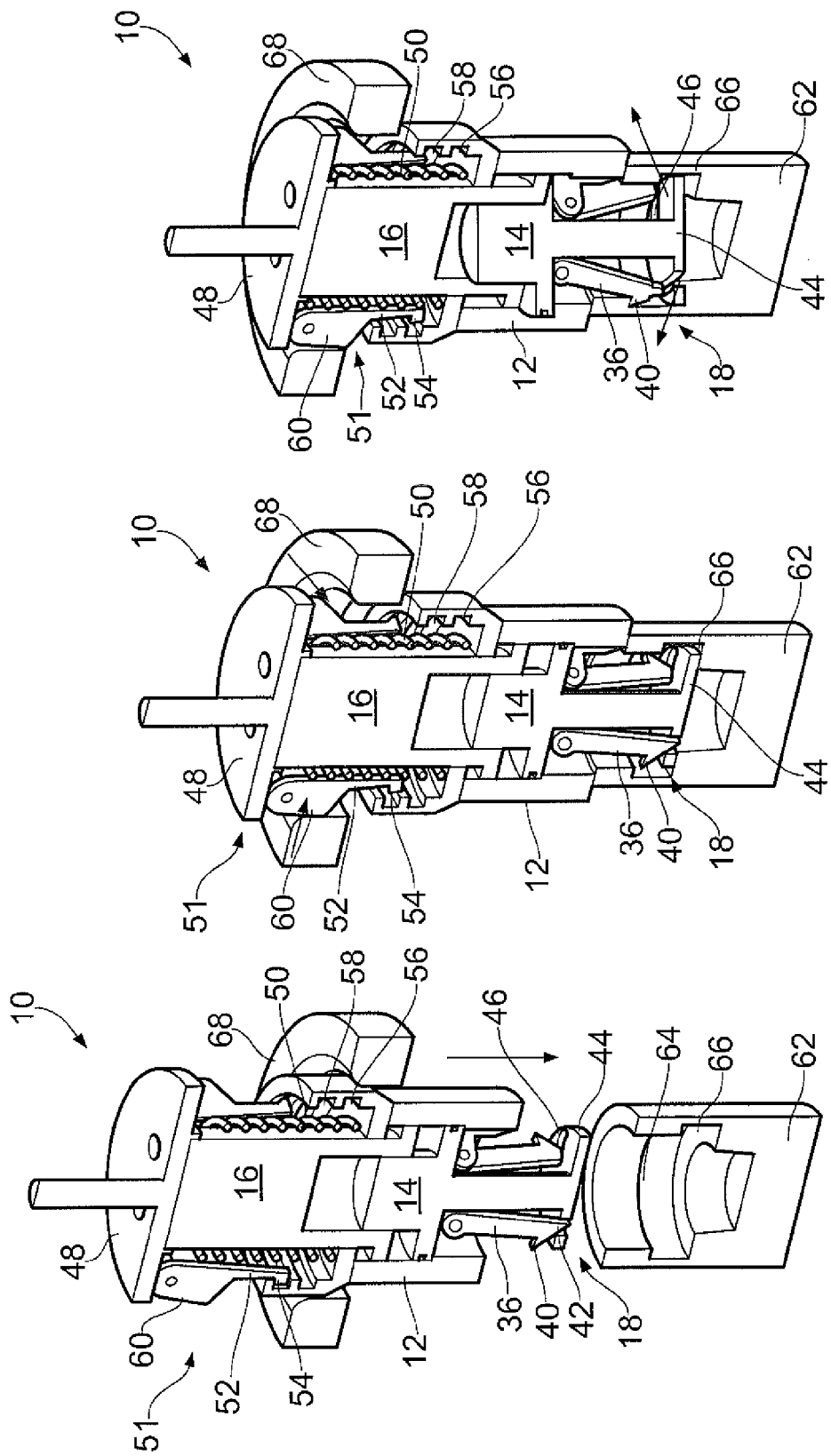

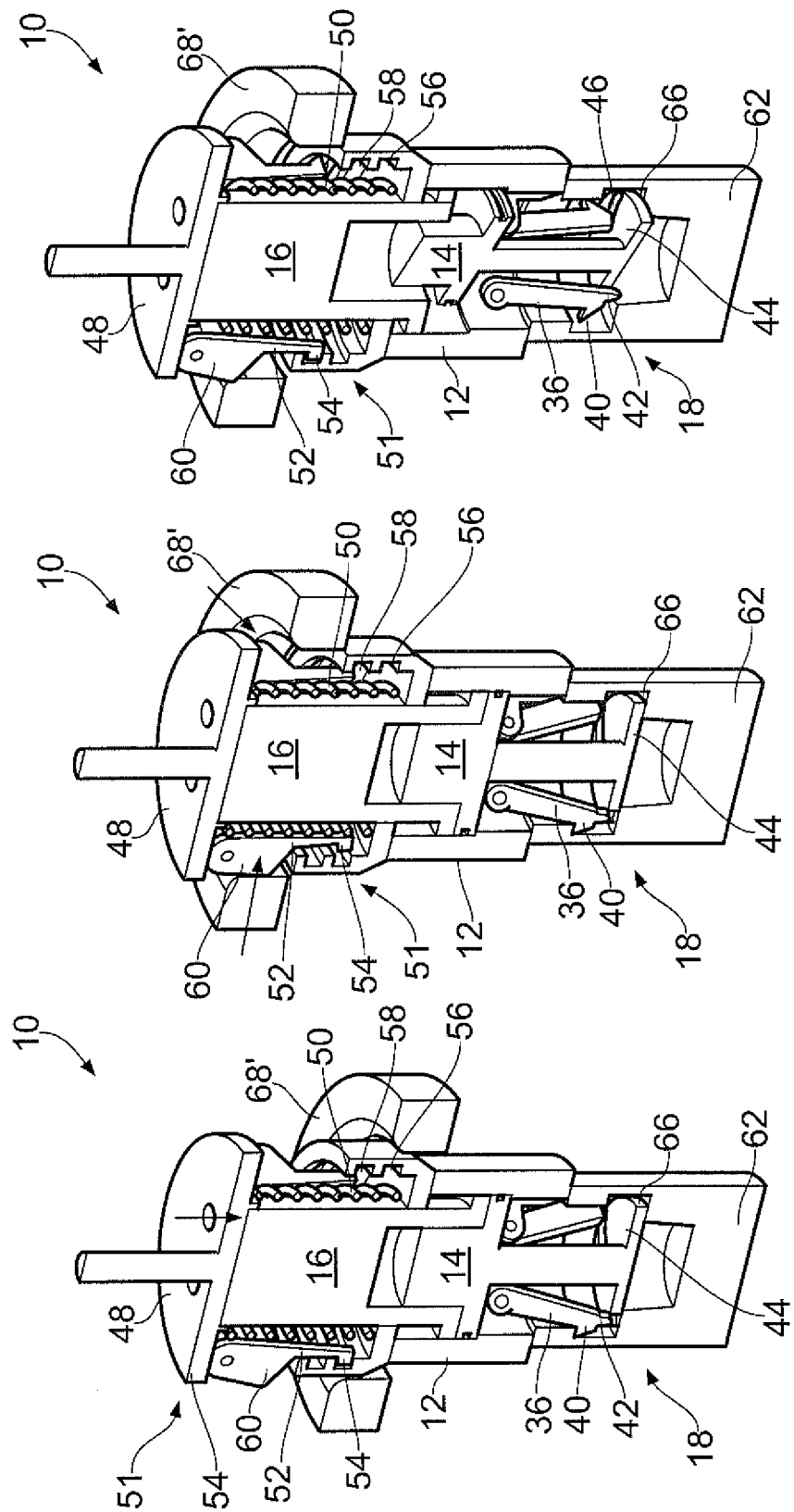

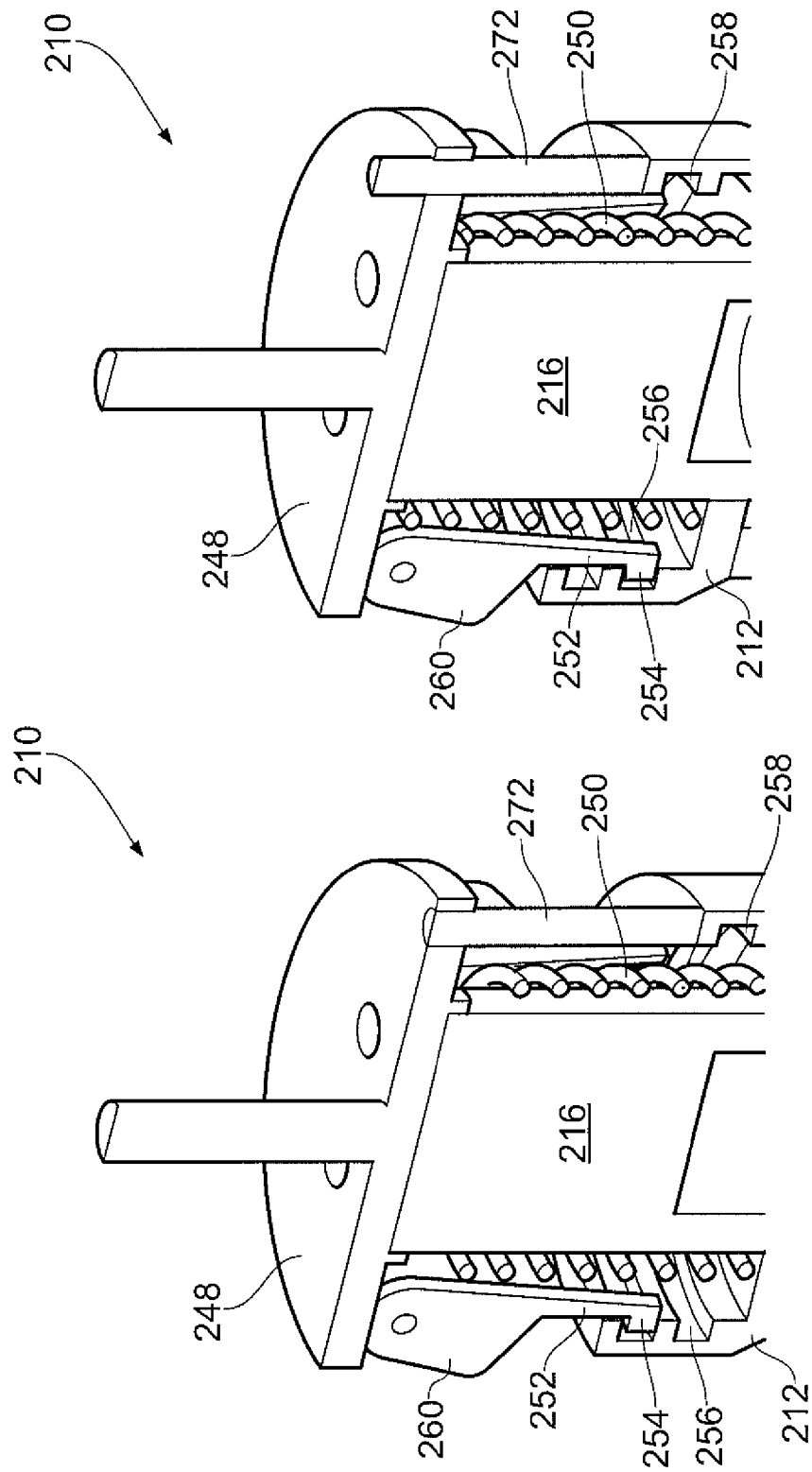

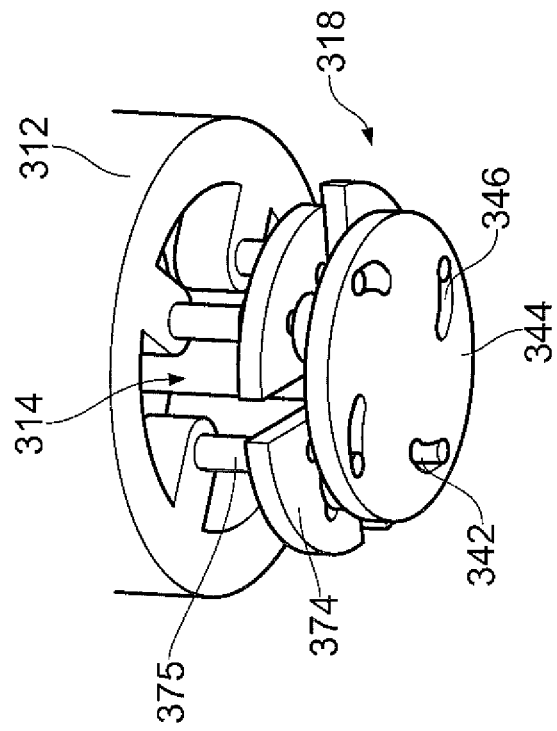
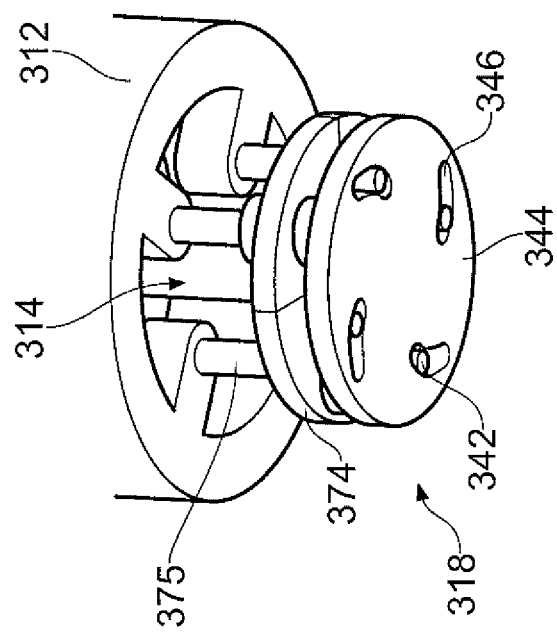
FIG. 9B
FIG. 9A

GRIPPER MECHANISM

FIELD OF INVENTION

The present invention relates to a gripper mechanism, in particular, but not exclusively a nuclear fuel rod gripper mechanism.

BACKGROUND

Nuclear fuel rods (also referred to as nuclear fuel assemblies) frequently require movement and transportation, for example to enable refueling of reactor cores or to take fuel rods for processing, storage or disposal.

Manipulators having gripper mechanisms are used to move and transport the fuel rods. The gripper mechanisms need to reliably attach onto the fuel rods so as to facilitate their safe transfer. Due to the hazardous nature of nuclear fuel rods, these gripper mechanisms should meet International Atomic Energy Agency (IAEA) recommendations, including:
 (a) Obtaining a positive indication that the gripper mechanism is correctly located on the fuel rod before lifting is commenced;
 (b) Once a fuel rod is gripped, the gripper mechanism should remain latched to a fuel rod upon loss of power;
 (c) The gripper mechanism should not be capable of decoupling from the fuel rod while a load is applied;
 (d) The gripper mechanism should only decouple from its load at specified elevations, even when no load is applied; and
 (e) The gripper mechanism should have an inherent safety device that prevents the fuel rod from becoming undesirably released from the gripper mechanism.

Current designs of gripper mechanisms are generally mechanically controlled rather than electrically controlled because radioactive environments tend to damage electrical equipment. It is also generally important to keep gripper mechanism design simple, as added complexity typically creates more risk.

Currently available gripper mechanisms grip the fuel rods either externally or internally via a cavity formed in a plug end of the fuel rod. Gripper mechanisms that grip the fuel rods externally interfere more with the immediate environment than gripper mechanisms that grip the fuel rods internally. As a result, when the fuel rod is gripped internally there is a reduced risk of collision with other surrounding nuclear fuel rods and of gripping onto and transferring something not intended for transportation.

An example of a known gripper mechanism that grips fuel rods internally is disclosed in U.S. Pat. No. 4,747,997A. The gripper mechanism of U.S. Pat. No. 4,747,997A operates by inserting inwardly biased fingers, with outwardly biased extensions, into a cavity formed in the plug end of a fuel rod. The biased fingers are then splayed open by an inner shaft. A circumferential groove is formed in the cavity of the fuel rod, and the biased fingers, when splayed, engage the circumferential groove of the cavity.

Gripper mechanisms having an internal engagement (similar to that described in U.S. Pat. No. 4,747,997A) often suffer from a difficulty in ascertaining whether or not the gripping mechanism has correctly engaged the fuel assembly (which is a recommendation of the IAEA standard).

Gripper mechanisms having an alternative configuration are also known. For example, many known gripper mechanisms include a latching mechanism that is activated by interaction with an external feature (e.g. a ring that surrounds an access entry point to the fuel rod).

SUMMARY OF INVENTION

The present invention seeks to address one or more problems associated with nuclear fuel rod gripper mechanisms of the prior art, and seeks to provide a gripper mechanism that is reliable for transporting objects, particularly hazardous objects.

A first aspect of the invention provides a gripper mechanism for moving an object having a surface cavity. The gripper mechanism comprises an actuation end moveable in an axial direction and a rotary body. The gripper mechanism comprises a first mechanism that is configured such that movement of the actuation end in an axial direction (e.g. by a predetermined distance and/or direction) rotates the rotary body. The gripper mechanism further comprises a gripper that is moveable between an engaged position and a disengaged position. In the engaged position the gripper is capable of engaging an object (e.g. engaging a feature provided in a surface cavity of an object) and in the disengaged position the gripper is capable of being received into and removed from a cavity of an object. The gripper mechanism comprises a second mechanism and the gripper is connected to the rotary body by the second mechanism. The second mechanism is configured such that rotary motion of the body moves the gripper between the engaged position and the disengaged position.

The provision of a rotary body activated by a linear input can improve the reliability of the gripper mechanism.

The directions referred to in this application will be described in more detail in the detailed description. However, generally, in the present application reference to direction refers to directions when the gripper mechanism is orientated for engagement or disengagement of an object.

The gripper mechanism may comprise a linear actuator. The actuation end may be defined at one end of the linear actuator. The rotary body may be linked to the actuation end via the linear actuator and the first mechanism. For example, the first mechanism may be configured such that movement of the linear actuator in an axial direction (e.g. by a predetermined distance and/or direction) rotates the rotary body. The first mechanism may be provided between the linear actuator and the rotary body.

A housing may surround at least a portion of the rotary body and/or the linear actuator. The housing may be substantially cylindrical. The rotary body and/or the linear actuator may be substantially cylindrical. The housing may be substantially coaxial to the rotary body and/or the linear actuator.

The gripper mechanism may comprise a latching arrangement configured to prevent the gripper moving from the engaged to the disengaged position before the actuation end is moved by a predetermined distance.

Optionally, the latching arrangement may be configured to prevent the gripper moving from the engaged to the disengaged position before the actuation end is moved by a predetermined distance in a predetermined direction. For example, the latching arrangement may be configured such that axial movement of the actuation end in a direction opposite to the desired direction of motion of the gripper mechanism at least partially unlatches the latching arrangement.

The latching arrangement may comprise an internal latch enclosed (e.g. entirely enclosed) within the gripper mechanism.

For example, the internal latch may be entirely enclosed by other components of the gripper mechanism. In exemplary embodiments, the internal latch may be positioned between the linear actuator and the rotary body. The linear actuator and/or the rotary body may enclose the internal latch. Additionally or alternatively, when the gripper mechanism comprises a housing, the internal latch may be enclosed within the housing of the gripper mechanism.

The internal latch may be integrally formed with the first mechanism.

The internal latch may be configured such that axial movement of the actuation end in a direction opposite to the desired direction of motion of the gripper mechanism unlatches the internal latch.

The provision of such an internal latch can further improve the reliability of the gripper mechanism.

The first mechanism may comprise a pin and a curved or angled pathway, the pin being arranged to move along the curved or angled pathway.

The curved or angled pathway may be defined by a slot. The pin may be provided on the linear actuator and the curved or angled pathway may be provided on the rotary body, or vice-versa.

The first mechanism may comprise a tick shaped pathway, e.g. the curved or angled pathway may have a tick shape. The tick shaped pathway may be arranged so that when the gripper is in the engaged position the pin is at a tip of the tick. The tick shaped pathway may be further arranged such that axially downward movement of the actuation end by a predetermined distance is required before the pin and actuation end can move axially upward.

The tick-shaped slot may be described as a modified V-shape, the modified V-shape having one arm shorter than the other. For example two linear or curved slots meeting at an apex, one of the slots being shorter than the other.

The latching arrangement may comprise an external latch. Provision of an external latch can further improve the reliability of the gripper mechanism.

At least a portion of the external latch may be positioned external to a volume defined by the remainder of the gripper mechanism such that the latch can be actuated by a component external to the gripper mechanism.

For example, when a housing is provided, at least a portion of the external latch may be positioned external to the housing of the gripper mechanism.

The gripper mechanism may comprise a housing. The external latch may comprise one or more latch arms engageable with the housing.

The latch arms may comprise one or more engagement features and the housing comprises one or more complimentary engagement features. For example, the housing may comprise one or more grooves (e.g. internal grooves and optionally circumferential grooves) and the latch arms may comprise one or more hooked portions.

The latch arms may be biased to a position of engagement with the housing. For example, the latch arms may be spring biased to a position of engagement with the housing, e.g. with a position of engagement with grooves (e.g. circumferential grooves) formed in the housing.

The engagement feature of the housing may comprise circumferential grooves provided at two axial locations on the housing; a first groove corresponding to a position where the gripper is in the disengaged position and a second groove corresponding to a position where the gripper is in the engaged position. The circumferential grooves preferably extend around the entire inner circumference of the housing, but in alternative embodiments the circumferential grooves may extend partially around the inner circumference of the housing.

A biasing element (e.g. a helical spring) may be arranged to resist axial movement of the actuation end. When the gripper mechanism comprises a linear actuator, the helical spring may be positioned circumferentially around the linear actuator. The helical spring may be positioned so as to be substantially coaxial with the linear actuator. When the gripper mechanism comprises a housing, the housing may comprise a stepped portion that defines a platform on which the helical spring may be seated.

The gripper mechanism may be configured such that in the engaged position at least a portion of the gripper is positioned more radially outward from a central longitudinal axis of the gripper mechanism than in the disengaged position.

The gripper mechanism may comprise a guide plate at a position axially beneath the gripper. The guide plate may be configured to guide the gripper between the engaged and the disengaged position. The guide plate may be provided at one end of the rotary body. The guide plate may be connected to or formed as part of the rotary body.

The guide plate may include a plurality of curved pathways and the gripper may include a plurality of projections (or pins) positioned in the curved pathways. The curved pathways may be arranged so as to transform rotational movement from the rotary body into radially outward or radially inward movement of the gripper.

The curved pathways may be defined by curved slots, and the projections may be positioned in said slots. The slots may extend partially through the thickness of the guide plate or fully through the thickness of the guide plate. Alternatively, the guide plate may comprise raised rims that define the pathways.

The gripper comprises a plurality of gripper arms, the gripper arms being arranged such that an end of each gripper arm pivots radially outwardly to the engaged position and radially inward to the disengaged position. For example, when the gripper mechanism comprises a housing, the gripper arms may be pivotally connected to the housing. The arms may comprise a hooked portion for engaging a cavity of an object. The hooked portion may be at a position distal to the pivotal connection with the housing.

The gripper may comprise a plurality of plates arranged to move radially inward and radially outward between the engaged and the disengaged positions.

The plates may be shaped to resemble a sector of a circle. The sector shaped plates may be positioned adjacent so as to form a full circle. When the gripper mechanism comprises a housing, the plates may be anchored to the housing. For example, the housing may comprise support pillars to which the plates are connected. Alternatively, the gripper mechanism may comprise a retainer plate for connecting the plates to the remainder of the gripper mechanism.

The gripper mechanism may comprise an indicator configured to indicate the position of the gripper.

The gripper mechanism may comprise an indication cable connected at one end to the gripper and extending through the gripper mechanism so as to exit the gripper mechanism at or near the actuation end. The cable may be arranged such that movement of the gripper between the engaged position and the disengaged position moves the cable so as to indicate the position of the gripper.

The cable may extend axially through the rotary body. The cable may extend axially through the linear actuator and/or the cover plate.

The gripper mechanism may comprise a housing arranged such that the actuation end is moveable relative to the housing.

The housing may have an indicator rod arranged such that the length of the indicator rod above a level coincident with the actuation end indicates the position of the gripper.

The gripper mechanism may comprise an axially moveable cover plate located at the actuation end. When the gripper mechanism comprises a linear actuator, the cover plate may be connected to the linear actuator or integrally formed therewith. When the gripper mechanism comprises an indicator rod, the length of the indicator rod above a level coincident with the cover plate may indicate the position of the gripper.

The gripper mechanism may be a nuclear fuel rod gripper mechanism, and in the engaged position the gripper may be capable of engaging a cavity in a plug end of a fuel rod and in the disengaged position the gripper may be capable of being received into and removed from a cavity in a plug end of a fuel rod.

A second aspect of the invention provides a gripper mechanism for moving an object having a surface cavity. The gripper mechanism comprises a gripper moveable between a disengaged position and an engaged position. In the disengaged position the gripper is capable of being received into and removed from a cavity of an object, and in the engaged position the gripper is capable of engaging an object. The gripper mechanism comprises an actuator, the actuator is configured such that movement of the actuator by a predetermined distance moves the gripper between the disengaged position and the engaged position. The gripper mechanism further comprises a latch enclosed (e.g. fully enclosed) within the remainder of the gripper mechanism. The latch is configured to retain the gripper in the engaged position until the actuator is moved by a pre-determined amount.

Provision of a latch enclosed within the gripper mechanism reduces the risk of the latch being accidently released and as such the risk of the gripper being accidently released during use is reduced compared to gripper mechanisms of the prior art.

The actuator may comprise a rotary body moveable in a rotational direction and optionally a linear actuator moveable in an axial direction.

The gripper mechanism may comprise a housing and the latch may be enclosed (e.g. fully enclosed) within the housing. Alternatively or additionally, the gripper mechanism may comprise a linear actuator and a rotary body, and the latch may be positioned between the linear actuator and the rotary body. For example, the linear actuator may have a recessed region and the rotary body may have a protruding region, and the protruding region of the rotary body may be positioned within the recessed region of the linear actuator. Alternatively, the rotary body may have a recessed region configured to receive a protruding region of the linear actuator. In such embodiments the latch may be positioned between the linear actuator and rotary body in the region of the recess.

The gripper mechanism of the second aspect may comprise one of, or any combination of, optional features of the gripper mechanism of the first aspect.

A third aspect of the invention provides a nuclear fuel rod gripper mechanism. The nuclear fuel rod gripper mechanism comprises a gripper moveable between a disengaged position and an engaged position. In the disengaged position the gripper is capable of being received into and removed from a cavity in a plug end of a fuel rod, and in the engaged position the gripper is capable of engaging a plug end of a fuel rod. The position of the gripper in the engaged position is radially outward of the position of the gripper in the disengaged position. The nuclear fuel rod gripper mechanism further comprises an actuator configured to move the gripper between the engaged position and the disengaged position. An indication cable is connected at one end to the gripper and extending through the gripper mechanism such that movement of the gripper between the engaged position and the disengaged position moves the cable so as to indicate the position of the gripper.

The cable may extend axially through the actuator, for example through a channel formed in the actuator.

The nuclear fuel rod gripper mechanism may comprise one of, or any combination of, optional features of the gripper mechanisms of the first or second aspects.

A fourth aspect of the invention provides a nuclear fuel rod gripper mechanism comprising: a gripper moveable between a disengaged position and an engaged position. In the disengaged position the gripper is capable of being received into and removed from a cavity in a plug end of a fuel rod, and in the engaged position the gripper is capable of engaging a plug end of a fuel rod. The position of the gripper in the engaged position is radially outward of the position of the gripper in the disengaged position. The nuclear fuel rod gripper mechanism further comprises an actuator configured to move the gripper between the engaged position and the disengaged position. An indication rod is arranged such that movement of the actuator alters a visible length of the indication rod so as to indicate the position of the gripper.

For example, the indication rod may be arranged such that movement of the actuator alters the amount the indication rod protrudes from an upper region of the gripper mechanism.

The nuclear fuel rod gripper mechanism may comprise one of, or any combination of, optional features of the gripper mechanism of the first or second aspects.

DESCRIPTION OF DRAWINGS

The invention will now be described, by way of example only, with reference to the accompanying drawings in which:

FIGS. 5A to 5C illustrates a perspective sectioned view of the nuclear fuel rod gripper mechanism of FIG. 1 at different stages of gripping a nuclear fuel rod;

FIGS. 6A to 6C illustrates a perspective sectioned view of the nuclear fuel rod gripper mechanism of FIG. 1 at different stages of releasing a nuclear fuel rod;

FIGS. 8A and 8B illustrates a partial perspective view of a further alternative nuclear fuel rod gripper mechanism having an indicator rod;

FIGS. 9A and 9B illustrates a perspective view of an alternative gripper of an alternative nuclear fuel rod gripper mechanism.

DETAILED DESCRIPTION

Figure 1:
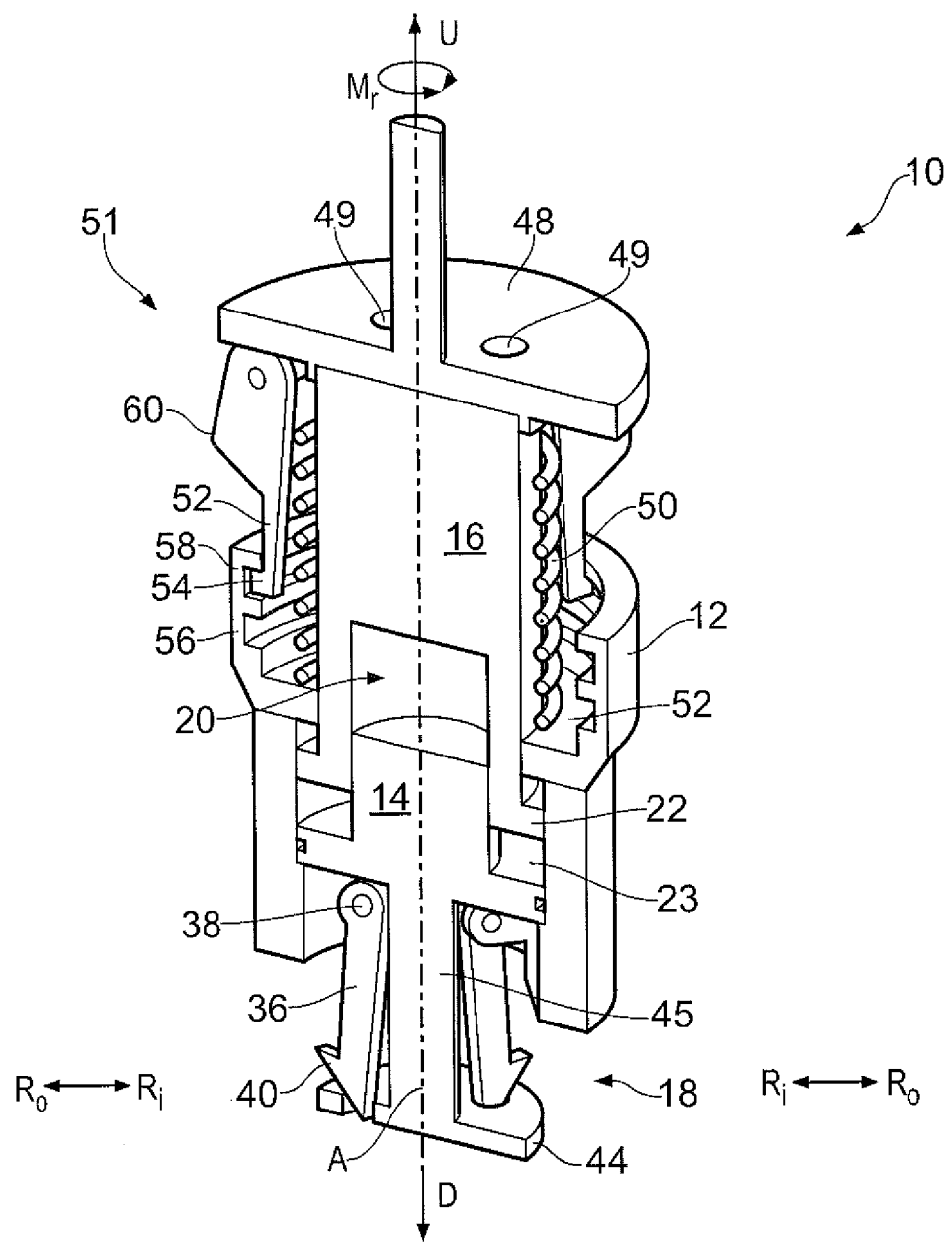
FIG. 1 illustrates a perspective sectioned view of a nuclear fuel rod gripper mechanism.

Referring to FIG. 1, a nuclear fuel rod gripper mechanism is indicated generally at 10. The gripper mechanism 10 includes a housing 12. In this embodiment, the housing is cylindrical. A rotary body 14 is located at least partially within the housing 12. Also positioned at least partially in the housing 12 is a linear actuator 16. The linear actuator 16 is positioned so as to be coaxial with the rotary body 14, and at one end thereof. At an opposite end of the rotary body 14 a gripper 18 is provided for engaging a fuel rod.

In the present application, an upward direction refers to, in use, a direction away from a fuel rod resting location (indicated by arrow U in FIG. 1) and a downward direction refers to, in use, a direction towards a fuel rod resting location (indicated by arrow D in FIG. 1). Rotary motion (indicated by $M_r$ in FIG. 1) refers to rotation about an axis of rotation of the rotary body 14, which in the presently described embodiments is coaxial to the central longitudinal axis (indicated at A in FIG. 1) of the rotary body. A radial direction refers to movement away from or towards the longitudinal axis A in a direction substantially perpendicular to the longitudinal axis A; radially outwards being a direction (indicated at $R_o$ in FIG. 1) away from the longitudinal axis and radially inwards being a direction (indicated at $R_i$ in FIG. 1) towards the longitudinal axis.

The linear actuator 16 is substantially cylindrical in shape. A cylindrical recess 20 is provided in one end of the linear actuator proximal to the rotary body 14. The end of the linear actuator that includes the recess 20 has a flange 22.

The rotary body 14 is substantially cylindrical in shape. An end of the rotary body nearest the linear actuator is dimensioned so as to be received in the recess of the linear actuator 16 and move therewithin relative to the linear actuator. A flange 23 is provided near said end and is dimensioned so as to provide a stop against which the flange 22 of the linear actuator can contact so as to limit axial movement of the linear actuator beyond that required for gripping a fuel rod.

Referring to FIGS. 2A to 2C and FIG. 3, a mechanism 24 is provided between the linear actuator and the rotary body within the recess 20. The mechanism 24 includes a slot 26 formed in the rotary body and a pin 28 protruding from the linear actuator 16. The pin 28 is dimensioned and positioned so that it is received in the slot 26. The slot 26 is curved to form a tick-shape; or in other words the slot is substantially V-shaped with one arm of the "V" being shorter than the other.

Figure 2C:
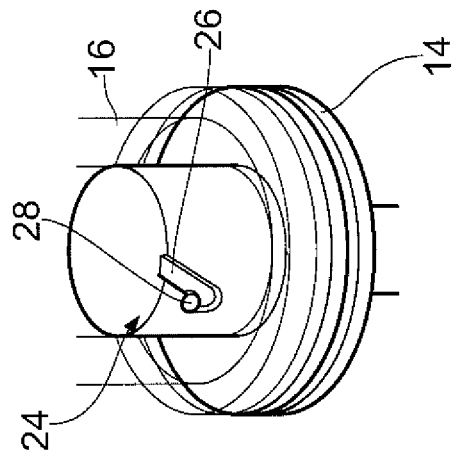
FIGS. 2A to 2C illustrate a perspective view of different stages of a mechanism provided between a rotary body and linear actuator of the nuclear fuel rod gripper mechanism of FIG. 1 for converting axial motion of the linear actuator to rotational motion of the rotary body.
Figure 2B:
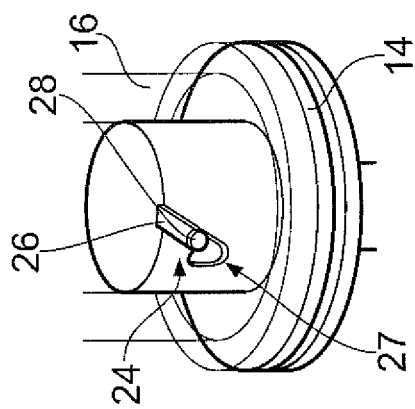
Figure 2A:
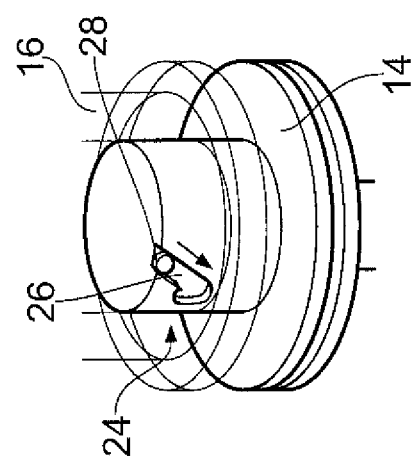
Figure 3:
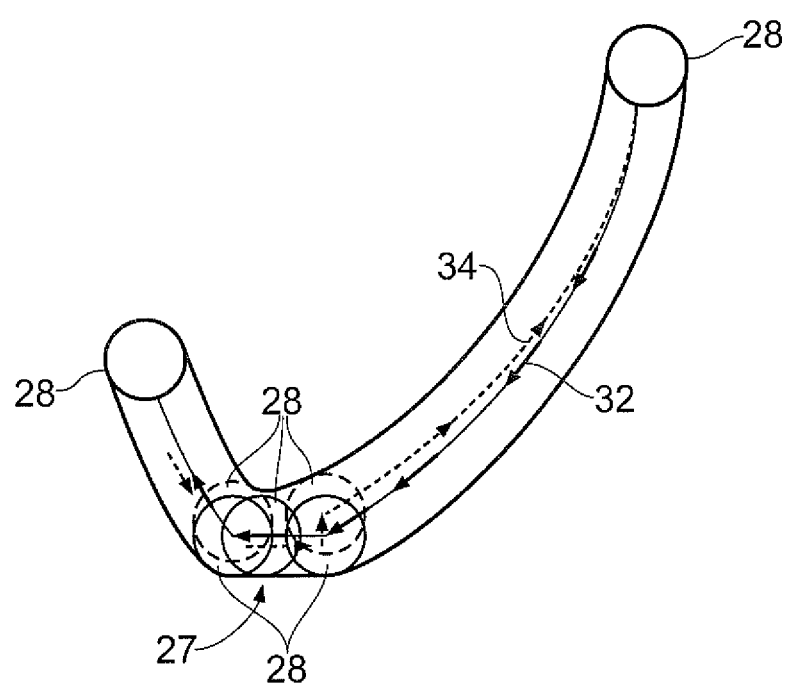
FIG. 3 illustrates a schematic plan view of the mechanism of FIGS. 2A to 2C.

FIGS. 2A to 2C show the various positions of the pin 28 as the linear actuator 16 is moved axially downwards. In FIG. 2A, the pin 28 is located at an axially upper position in the slot 26. As the linear actuator 16 is moved axially downwards, the pin 28 moves downwards through the slot 26. Due to the curved nature of the slot 26, the movement of the pin 28 in the slot 26 causes the rotary body 14 to rotate. The pin 28 continues to move along the slot 26 as the linear actuator is moved axially downwards until the pin reaches an inflection region 27 of the tick-shaped slot 26, as shown in FIG. 2B. Then when an actuation force, which caused the axial movement of the linear actuator, is released, the pin 28 moves to the tip of the smaller arm of the tick-shaped (or substantially V-shaped) slot, as shown in FIG. 2C. The transition from the larger arm to the smaller arm of the tick-shaped (or substantially V-shaped) slot can be seen more clearly in FIG. 3, in which the solid arrow indicates the above described motion. To move the pin back to the larger arm of the tick-shaped slot the linear actuator needs to be moved axially downward, the pin can then move to the larger arm and axially upward movement of the linear actuator will move the pin back to the position shown in FIG. 2A, the broken line arrows 34 in FIG. 3 indicate this motion. As will be described in more detail later, this arrangement of pin and slot provides an internal latch.

Figure 4B:
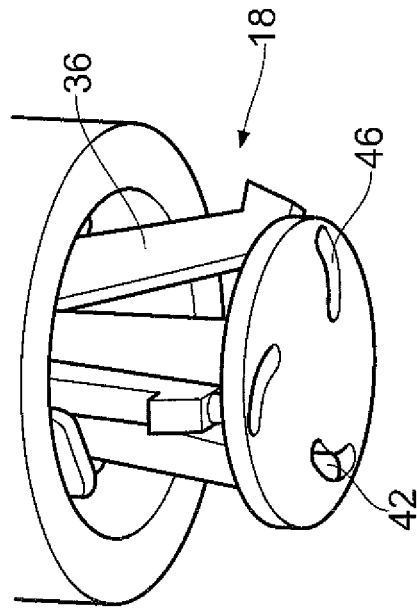
FIGS. 4A and 4B illustrates a perspective view of a gripper of the nuclear fuel rod gripper mechanism of FIG. 1.
Figure 4A:
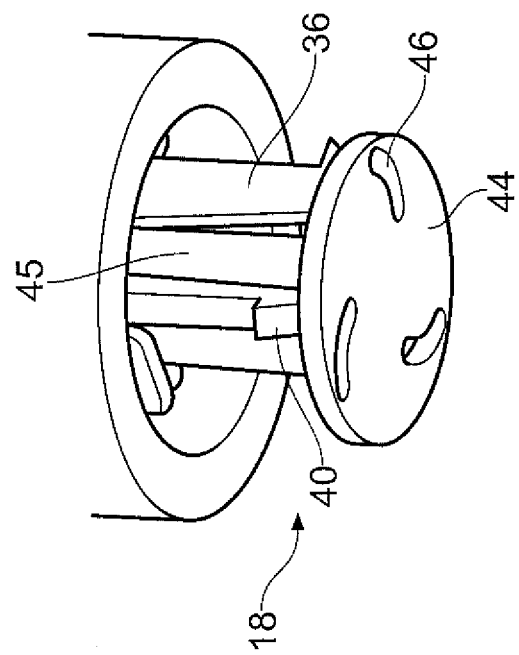

Now the gripper 18 will be described in more detail with reference to FIGS. 1, 4A and 4B. The gripper includes three gripper arms 36 (only one labelled). The arms are pivotally connected to the rotary body at a pivotal connection 38. Each arm includes a foot or hooked portion 40 at an end opposite the pivotal connection. The rotary body 14 includes an elongate portion 45 that extends to a position substantially aligned with the hooked portion of the arms 36. A plate 44 is provided at an end of the elongate portion 45 adjacent the hooked portion of the arms. In the present embodiment the elongate portion is cylindrical and the plate is round, but in alternative embodiments the elongate portion and/or the plate may be any other suitable shape. The rotary body is also shown as an integrally formed component, but in alternative embodiments the rotary body may be formed of a number of components connected together.

A mechanism connects the arms 36 to the rotary body 14 such that rotary movement of the rotary body causes the arms 36 to pivot about the pivotal connection 38 and move in a radial direction. In the present embodiment, the mechanism includes three curved slots 46 (only one labelled for clarity) provided in the plate 44 and a pin 42 formed on each heel of the hooked portion of the arms. Each slot 46 receives a respective pin 42, such that rotational movement of the rotary body moves the pin 42 along the slot 46 causing the hooked portion 40 of the gripper arms 36 to move radially outward or radially inward depending on the direction of rotation of the rotary body.

Referring back to FIG. 1, the gripper mechanism 10 further includes a cover plate 48. The cover plate 48 is connected to an actuation end of the linear actuator 16. In the present embodiment, the actuation end is an end of the linear actuator distal to the rotary body 14. In the present embodiment, the cover plate is connected to the linear actuator via four screws 49 (only two shown), but in alternative embodiments any other suitable connection may be used, e.g. any suitable type of fastener or bonding, or the cover plate may be integrally formed with the linear actuator.

A helical spring 50 is positioned around the linear actuator 16 and is substantially coaxial thereto. A stepped region 52 of the housing 12 forms a platform on which the helical spring 50 is seated. The helical spring 50 extends between the stepped region and the cover plate 48 so as to provide a degree of resistance to axially downward movement of the cover plate, and therefore also a degree of resistance to axially downward movement of the linear actuator 16.

The gripper mechanism 10 also includes an external latch 51. The external latch includes three latch arms 52 pivotally connected to the cover plate 48, each arm being provided with an engagement feature that corresponds to an engagement feature provided on an internal surface of the housing 12. Each latch arm is biased in a radially outward direction, more specifically the latch arms are spring loaded. The engagement feature of the latch arm is a hooked portion 54. In the present embodiment, two engagement features are provided in the housing; one corresponding to a position when a fuel rod is being gripped and one corresponding to a position when no fuel rod is being gripped. The engagement features formed in the housing are two circumferential recesses 56, 58, spaced axially apart. The circumferential recesses are dimensioned and shaped to receive the hooked portion of the latch arms.

The latch arms 52 further include a shoulder portion 60 which is dimensioned to protrude out from the general profile defined by the housing 12. The functionality of the shoulder portion will become clear in the following discussion of how the gripper mechanism 10 operates.

As can be seen in FIGS. 5A to 5C, the gripper mechanism 10 is intended for use with a fuel rod (also known as a fuel assembly) 62 that includes a cavity 64 in a plug end of the fuel rod. A circumferential groove 66 is formed in the cavity 64 of the fuel rod. Generally, in fuel arrangements, a static ring 68 is provided at a position spaced axially upward from the fuel rod. The gripper mechanism 10 can be used with existing fuel rods (or fuel assemblies) with internal lifting features, or with new fuel rods (or fuel assemblies) that are specifically designed for use with gripper mechanism 10.

Now the process of gripping the fuel rod 62 will be described. Firstly, the lower end of the gripper mechanism 10 is positioned through the centre of the ring 68, as shown in FIG. 5A. The gripper mechanism 10 is then moved downwards. As the gripper mechanism moves downwards, the shoulder 60 of the latch arm 52 interacts with the ring 68 to pivot the latch arm radially inwards. Pivoting the latch arms radially inwards, disengages the hooked portion 54 of the latch arm from the groove 58 of the housing 12 (i.e. the external latch 51 is unlatched), as shown in FIG. 5B. The gripper mechanism 10 is dimensioned such that (e.g. the axial distance between the plate 44 and the upper groove 58 in the housing 12, and the position of the shoulder of the latch arm is such that), when the external latch is unlatched, the plate 44 is in contact with a platform of the cavity 64.

The cover plate 48 is then moved downwards, compressing the spring 50 and moving the linear actuator 16 axially downward. The axial downward motion of the linear actuator 16 moves the pin 28 of the linear actuator in the slot 26 of the rotary body 14, which causes the rotary body to rotate. Rotation of the rotary body 14 causes the pins 42 of the gripper arms 36 to move in the slots 46 of the plate 44, causing the hooked portion 40 of the gripper arms to move radially outward to an engaged position. In the engaged position, the gripper arms engage the recess 66 formed in the fuel rod 62.

The fuel rod 62 is then lifted by moving the gripper mechanism 10 axially upwards, via a force applied to the cover plate 48. When an initial upward force is applied to the cover plate, only the cover plate and the linear actuator 16 move upwards so as to position the pin 28 of the mechanism 24 at the tip of the tick shaped slot 26. In this position, the rotary body 14 is latched to the linear actuator such that only axially downward movement of the linear actuator 16 can unlatch the rotary body and linear actuator and cause the rotary body to rotate. Since no axially downward force will be applied until the fuel rod 62 is in a new desired position, the internal latch prevents undesired movement of the rotary body, and therefore also prevents undesired movement of the gripper 18.

Once the pin 28 is at the tip of the tick-shaped slot 26, subsequent upward force applied to the cover plate 48 moves the gripper mechanism 10 upwards. As the gripper mechanism moves axially upward, the latch arms 52 of the external latch 51 are moved out of contact with the ring 68, which in turn, due to the biasing of the latch arms, moves the hooked portion 54 of each latch arm into engagement with the lower axial recess 56 of the housing 12. Thus, the gripper mechanism 10 is further latched (at the external latch) to prevent unwanted movement of the gripper 18, by preventing unwanted axial movement of the linear actuator 16 relative to the housing 12. The gripper mechanism 10 and fuel rod 62 are then fully removed from the first location.

Referring now to FIGS. 6A to 6C, to position the fuel rod 62 in a second desired location, the gripper mechanism 10 and fuel rod 62 are placed through the centre of the ring 68' near the second location, as shown in FIG. 6A. Further axially downward movement of the gripper mechanism 10 engages the shoulders 60 of the latch arms 52 with the ring 68', causing the latch arms 52 to move radially inwards and disengage from the lower recess 56 of the housing 12, as shown in FIG. 6B.

The linear actuator 16 can then be moved axially downwards relative to the housing 12 to unlatch the internal latch (i.e. move the pin 28 to the inflection region 27 of the tick-shaped slot 26 (pin 28 and slot 26 including the inflection region 17 are not shown in FIGS. 6A to 6C, but are shown in FIGS. 2A to 2C and 3)). The linear actuator is then moved axially upwards relative to the housing. The axially upward movement of the linear actuator rotates the rotary body 14, causing the gripper arms 36 to move radially inwards and disengage the groove 66 of the fuel rod 62, in a similar manner to the reverse of that described for engaging the fuel rod.

The gripper mechanism 10 is then moved axially upwards, such that the shoulders 60 of the latch arms 52 are no longer in contact with the ring 168, and the hooked portion 54 of the latch arms move radially outwards to engage the upper recess 58 of the housing 12, as shown in FIG. 6C. The gripper mechanism 10 can then be fully removed from the ring 68, leaving the fuel rod 62 in the second position.

As has been demonstrated, the gripper mechanism 10 needs to be activated by an external feature situated at a safe put-down location (e.g. ring 68, 68'), as is known to be good practice within the art. However, the described gripper mechanism is advantageous over prior art designs because a positive input is required to engage or disengage with a fuel rod (e.g. downward movement of the linear actuator to unlatch the linear actuator from the rotary body). Thus, the possibility of accidental gripper release is significantly reduced compared to gripper mechanisms of the prior art.

The gripper mechanism 10 also meets many of the recommendations of the International Atomic Energy Agency (IAEA), including that: the gripper mechanism remains in the engaged position upon loss of power; the gripper mechanism should not decouple unintentionally from the fuel rod; the gripper mechanism should only decouple from the fuel rod at specified elevations, even when no load is applied; and the gripper mechanism has an inherent safety device that prevents the fuel rod from undesirably releasing from the gripper mechanism. As will be described, the gripper mechanism 10 is also capable of including an indicator configured to indicate the position of the gripper.

Figure 7:
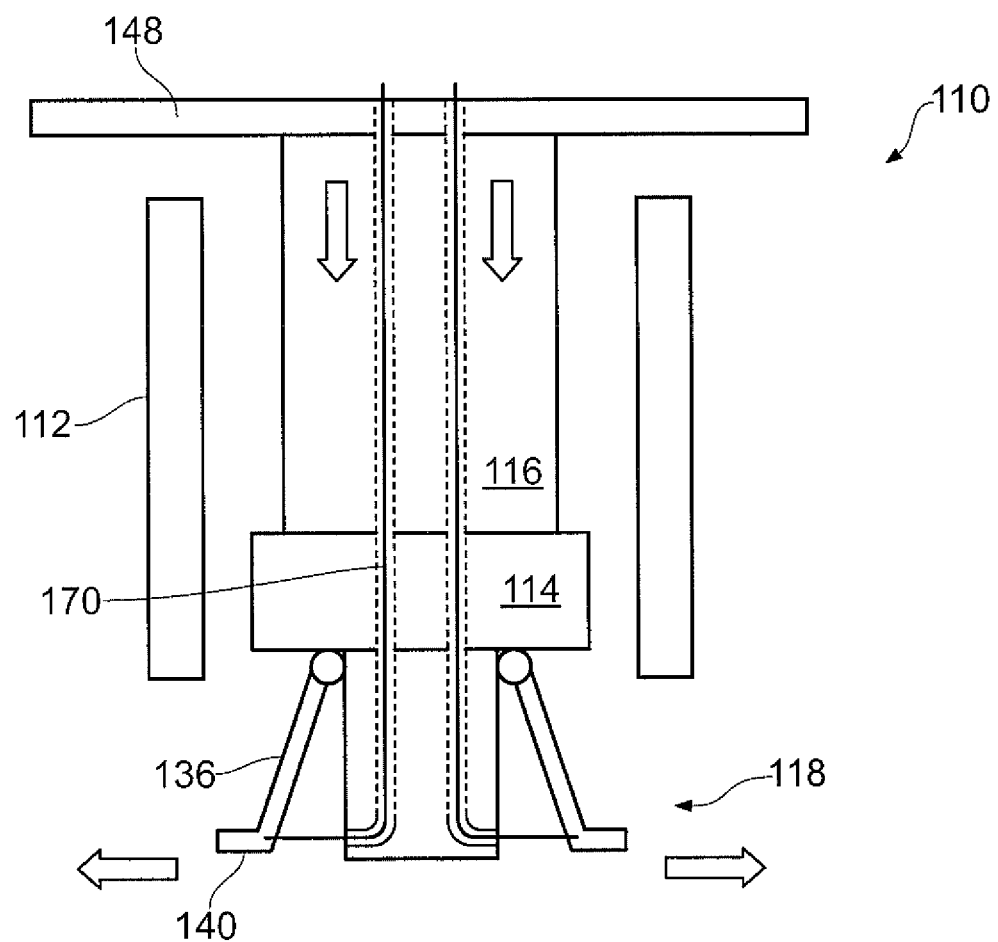
FIG. 7 illustrates a cross sectional view of an alternative nuclear fuel rod gripper mechanism having an indicator cable.

A modification to the above described gripper mechanism 10 is indicated generally at 110 in FIG. 7. The gripper mechanism 110 is similar to the gripper mechanism previously described, and similar features are given similar reference numerals but with a prefix "1". However, the gripper mechanism 110 further includes an indicator cable or wire 70. The indicator cable 70 connects to the hooked portion 140 of each of the gripper arms 136 and extends axially through the rotary body 114, linear actuator 116, and cover plate 148 through a channel formed therein. The cable includes indicator marks. During use, movement of the gripper arms 136 radially outwards moves the indicator cable 170 down the channel formed in the rotary body 114, linear actuator 116 and cover plate 148, thus indicating the position of the gripper arms. In this way, a visual indicator is provided to indicate the position of the gripper arms.

Referring to FIGS. 8A and 8B, a further alternative gripper mechanism 210, similar to the gripper mechanism of FIG. 1 is shown, but the gripper mechanism 210 of FIGS. 8A and 8B includes an indicator rod 272. Similar features are given similar reference numerals but with a prefix "2".

The indicator rod 272 is connected to the housing 212. When the linear actuator 216 moves axially downwards and axially upwards, the distance the rod 272 extends above the cover plate 248 is altered. The distance the rod extends above the cover plate indicates the position of the gripper arms 236. Visual markings may be provided on the indicator rod to aid in identifying the position of the gripper arms.

As will be understood by the person skilled in the art, a gripper mechanism may include both the indicator cable of the embodiment of FIG. 7 and the indicator rod of the embodiment of FIGS. 8A and 8B.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

For example, an indicator cable and/or an indicator rod have been described as optional features for indicating the position of the gripper, but in alternative embodiments, other indicator mechanisms may be used, for example electrical contact methods or fluid displacement methods.

In further alternative embodiments, the gripper may be of an alternative configuration. Referring to FIGS. 9A and 9B an alternative gripper 318 is illustrated. The gripper 318 includes a plurality of plate segments 374 that are anchored to the housing 312, in this embodiment four plate segments and four pillar supports are provided, but any number of plate segments and/or pillar supports may be provided. A pin 342 protrudes downwardly from each of the plates and is received in a curved slot 346 formed in a plate 344 of the rotary body 314.

Figure 10B:
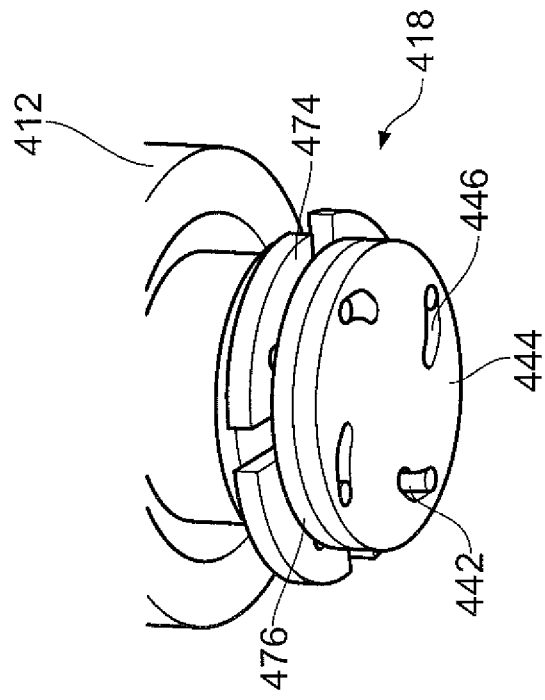
FIGS. 10A and 10B illustrates a perspective view of a further alternative gripper of a further alternative nuclear fuel rod gripper mechanism.
Figure 10A:
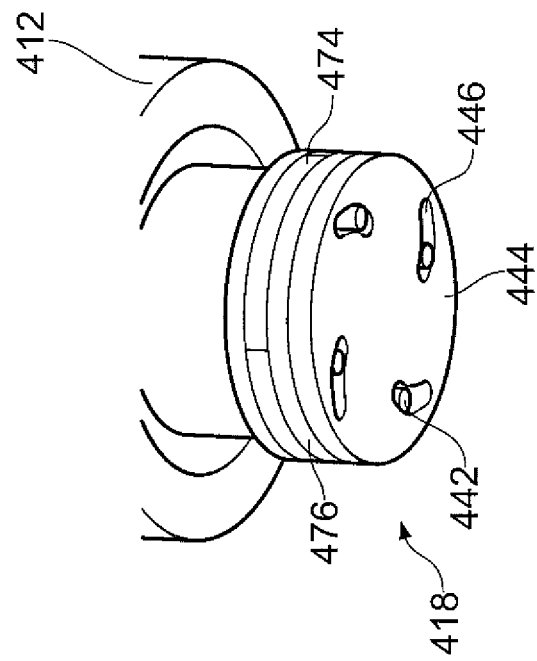

A further alternative gripper 418 is illustrated in FIGS. 10A and 10B. Gripper 418 is similar to the gripper 318 of FIGS. 9A and 9B, but instead of being anchored to the housing via support pillars, a retaining disc 476 is used. In FIGS. 10A and 10B similar reference numerals are used for similar features as the previously described embodiments, but with a prefix "4".

In the presently described embodiments a rotary body and a linear actuator are provided, but in an alternative embodiment the actuation end may be one end of the rotary body. In such embodiments, a bearing may be provided between the actuation end (or a position where an axial input is applied) and the rotary body so as to avoid transmitting rotational movement to external equipment. In this or other embodiments, a mechanism may be provided between the rotary body and the housing to rotate the rotary body upon receiving an axial input.

In the described embodiments a helical spring is used to bias the cover plate to an axially upward position, but in alternative embodiments one or more of any suitable biasing members may be used.

The mechanism provided between the linear actuator and the rotary body includes a tick-shaped slot and a pin, but in alternative embodiments the slot may be an angled slot (with or without the tick portion at one end) or the slot may be curved (without the tick portion at one end). In further alternative embodiments, a mechanism other than a slot and pin may be used, for example the mechanism may include a screw thread, a crank, gears, a rack and pinion, and/or a worm gear. In yet further alternative embodiments, instead of providing a pathway in the form of a slot, raised protrusions may define the pathway.

In the embodiment of FIG. 1, three gripper arms are provided, but in alternative embodiments any suitable number of gripper arms may be provided, for example three or more gripper arms. Similarly, in the embodiment shown in FIGS. 9A, 9B, 10A and 10B, four gripper plate segments are provided, but in alternative embodiments less than four plates, e.g. three plates, or more than four plates, may be provided.

Although previous embodiments have been described in connection with moving nuclear fuel rods (e.g. in the Civil Nuclear Industry or for nuclear reactors on submarines), the gripper mechanism may be used in other high-integrity coupling applications. Since the gripper will activate only at certain positions due to actuation by an external feature, it could be highly beneficial in any industry that requires standards similar to those applied in the nuclear industry, or any application that needs a high-integrity gripped connection. Its mechanical robustness, reliance on engagement and disengagement by means of an external feature, and its ability to maintain its grip in the event of loss of power make it ideal for applications such as: transferring cargo of a hazardous, fragile or expensive nature, such as canisters of hazardous chemicals; high-integrity fuel hose latching; and/or high-integrity couplings, such as spacecraft docking mechanisms.

The invention claimed is:

1. A gripper mechanism for moving an object having a surface cavity, the gripper mechanism comprising:
   an actuation end moveable in an axial direction;
   a rotary body;
   a first mechanism configured such that movement of the actuation end in an axial direction rotates the rotary body;
   a gripper moveable between an engaged position and a disengaged position, wherein in the engaged position the gripper is capable of engaging an object and in the disengaged position the gripper is capable of being received into and removed from a cavity of an object,
   wherein the gripper is connected to the rotary body by a second mechanism configured such that rotary motion of the body moves the gripper between the engaged position and the disengaged position; and
   a latching arrangement comprising an internal latch enclosed within the gripper mechanism, wherein:
   the latching arrangement is configured to prevent the gripper moving from the engaged to the disengaged position before the actuation end is moved by a predetermined distance; and
   the latching arrangement is configured such that axial movement of the actuation end in a direction opposite to a desired direction of motion of the gripper mechanism at least partially unlatches the latching arrangement.

2. The gripper mechanism according to claim 1 comprising a linear actuator, wherein the actuation end is defined at one end of the linear actuator.

3. The gripper mechanism according to claim 2, wherein the first mechanism is provided between the linear actuator and the rotary body.

4. The gripper mechanism according to claim 1 wherein the internal latch is configured such that axial movement of the actuation end in the direction opposite to the desired direction of motion of the gripper mechanism unlatches the internal latch.

5. The gripper mechanism according to claim 1 wherein the first mechanism comprises a pin and a curved pathway, the pin being arranged to move along the curved pathway.

6. The gripper mechanism according to claim 5, wherein the curved pathway has a tick shape arranged so that when the gripper is in the engaged position the pin is at a tip of the tick, and arranged such that axially downward movement of the actuation end by a predetermined distance is required before the pin and actuation end can move axially upward.

7. The gripper mechanism according to claim 1 wherein the latching arrangement comprises an external latch, and wherein at least a portion of the external latch is positioned external to a volume defined by a remainder of the gripper mechanism such that the latch can be actuated by a component external to the gripper mechanism.

8. The gripper mechanism according to claim 1, wherein a biasing element is arranged to resist axial movement of the actuation end.

9. The gripper mechanism according to claim 1, wherein the gripper is configured such that in the engaged position at least a portion of the gripper is positioned more radially outward from a central longitudinal axis of the gripper mechanism than in the disengaged position.

10. The gripper mechanism according to claim 1 comprising an indicator configured to indicate the position of the gripper.

11. The gripper mechanism according to claim 1, wherein the gripper mechanism is a nuclear fuel rod gripper mechanism, and in the engaged position the gripper is capable of engaging a cavity in a plug end of a fuel rod and in the disengaged position the gripper is capable of being received into and removed from a cavity in a plug end of a fuel rod.

12. A gripper mechanism for moving an object having a surface cavity, the gripper mechanism comprising:
an actuation end moveable in an axial direction;
a rotary body;
a first mechanism configured such that movement of the actuation end in an axial direction rotates the rotary body;
a gripper moveable between an engaged position and a disengaged position, wherein in the engaged position the gripper is capable of engaging an object and in the disengaged position the gripper is capable of being received into and removed from a cavity of an object,
wherein the gripper is connected to the rotary body by a second mechanism configured such that rotary motion of the body moves the gripper between the engaged position and the disengaged position;
a latching arrangement configured to prevent the gripper moving from the engaged to the disengaged position before the actuation end is moved by a predetermined distance,
wherein the latching arrangement comprises an external latch and at least a portion of the external latch is positioned external to a volume defined by a remainder of the gripper mechanism such that the latch can be actuated by a component external to the gripper mechanism; and
a housing wherein the external latch comprises one or more latch arms engageable with the housing.

13. The gripper mechanism according to claim 12, wherein the latch arms comprise one or more engagement features and the housing comprises one or more complimentary engagement features.

14. The gripper mechanism according to claim 13, wherein the engagement feature of the housing comprises circumferential grooves provided at two axial locations on the housing; a first groove corresponding to a position where the gripper is in the disengaged position and a second groove corresponding to a position where the gripper is in the engaged position.

15. The gripper mechanism according to claim 12, wherein the latch arms are biased to a position of engagement with the housing.

16. The gripper mechanism according to claim 12, wherein the gripper mechanism is a nuclear fuel rod gripper mechanism, and in the engaged position the gripper is capable of engaging a cavity in a plug end of a fuel rod and in the disengaged position the gripper is capable of being received into and removed from a cavity in a plug end of a fuel rod.

17. The gripper mechanism according to claim 12, wherein the latching arrangement comprises an internal latch enclosed within the gripper mechanism.

18. A gripper mechanism for moving an object having a surface cavity, the gripper mechanism comprising:
an actuation end moveable in an axial direction;
a rotary body;
a first mechanism configured such that movement of the actuation end in an axial direction rotates the rotary body;
a gripper moveable between an engaged position and a disengaged position, wherein in the engaged position the gripper is capable of engaging an object and in the disengaged position the gripper is capable of being received into and removed from a cavity of an object,
wherein the gripper is connected to the rotary body by a second mechanism configured such that rotary motion of the body moves the gripper between the engaged position and the disengaged position, and the gripper is configured such that in the engaged position at least a portion of the gripper is positioned more radially outward from a central longitudinal axis of the gripper mechanism than in the disengaged position; and
a guide plate at a position axially beneath the gripper, wherein the guide plate is configured to guide the gripper between the engaged and the disengaged position.

19. The gripper mechanism according to claim 18, wherein the gripper mechanism is a nuclear fuel rod gripper mechanism, and in the engaged position the gripper is capable of engaging a cavity in a plug end of a fuel rod and in the disengaged position the gripper is capable of being received into and removed from a cavity in a plug end of a fuel rod.

* * * * *